No. 773,097. PATENTED OCT. 25, 1904.
J. W. PACKARD & W. A. HATCHER.
CONTROLLING MECHANISM FOR MOTOR VEHICLES.
APPLICATION FILED MAR. 5, 1902.
NO MODEL. 5 SHEETS—SHEET 1.
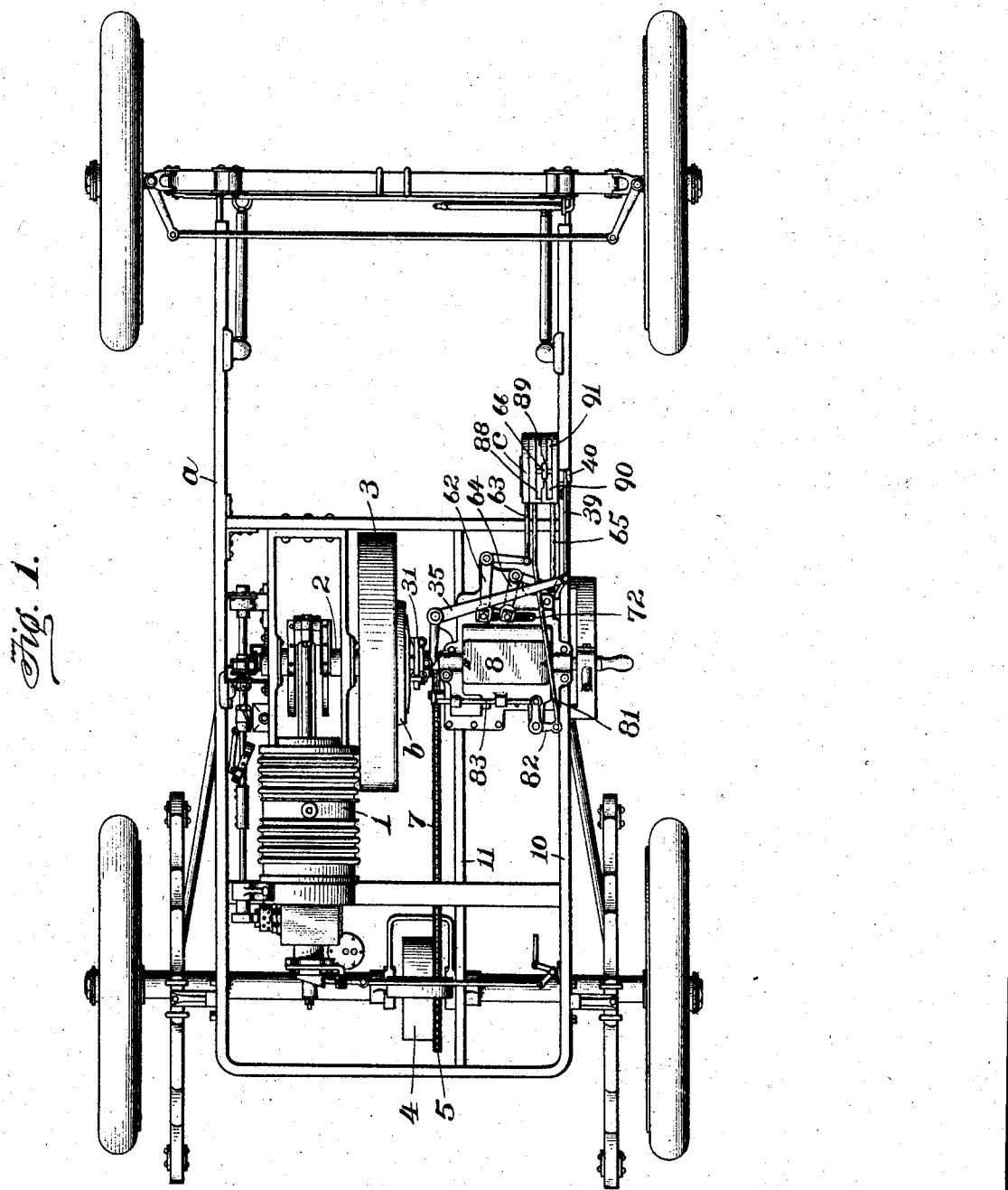
Witnesses
Fenton S. Pelt,
C. W. Clement.
Inventors
James W. Packard
William A. Hatcher
By Watson & Watson
Attorneys

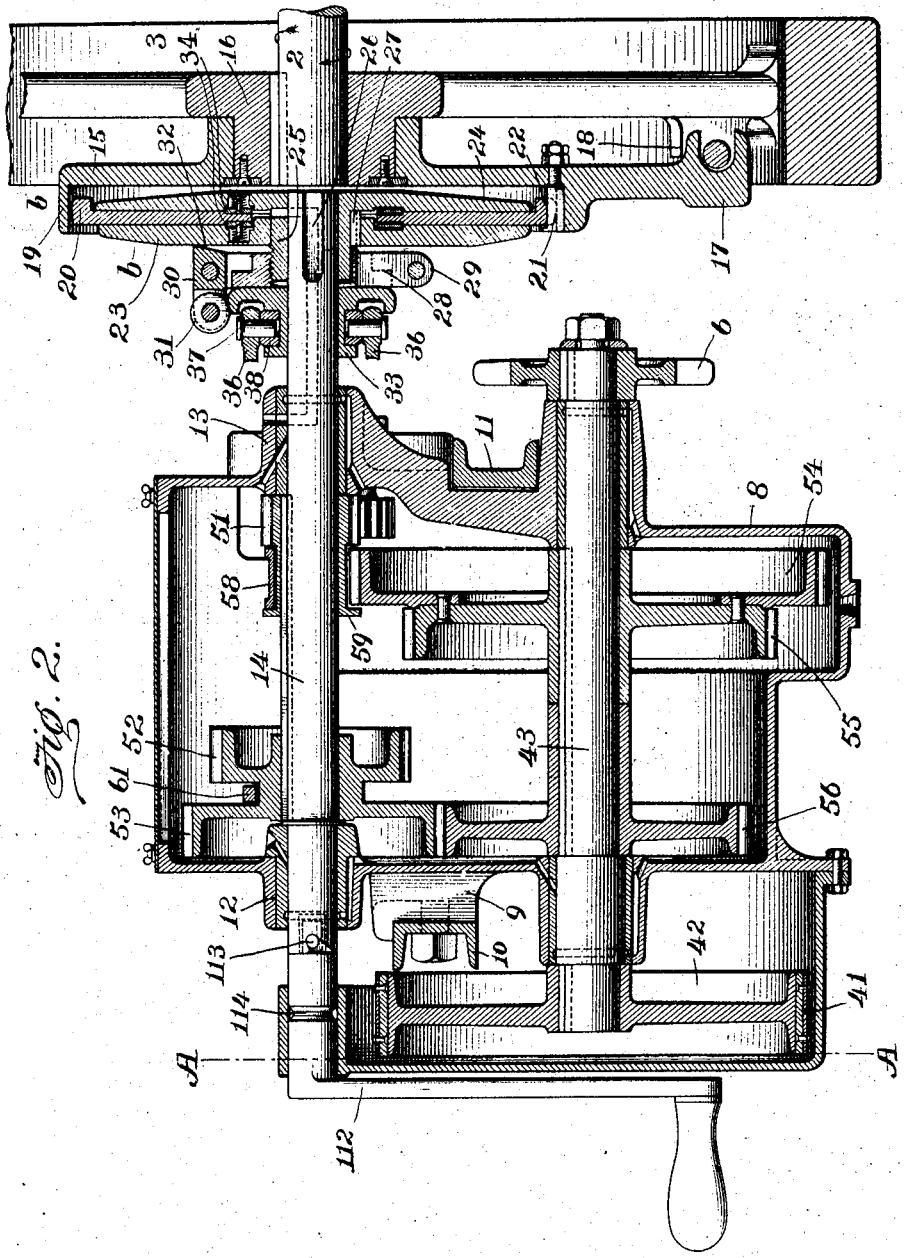

No. 773,097. PATENTED OCT. 25, 1904.
J. W. PACKARD & W. A. HATCHER.
CONTROLLING MECHANISM FOR MOTOR VEHICLES.
APPLICATION FILED MAR. 5, 1902.
NO MODEL. 5 SHEETS—SHEET 3.
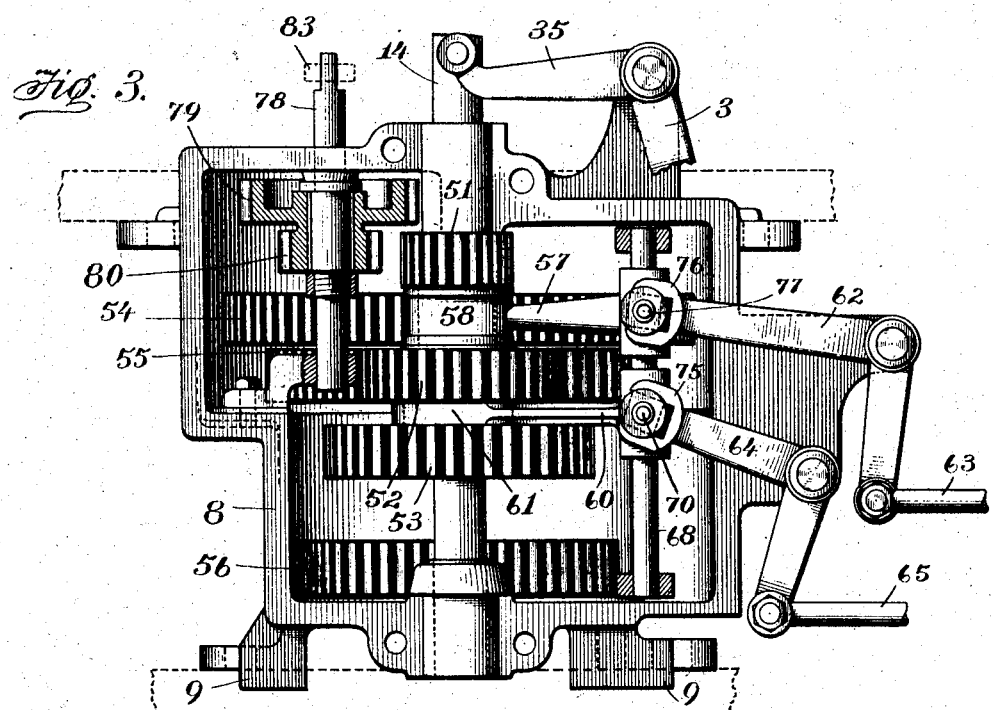
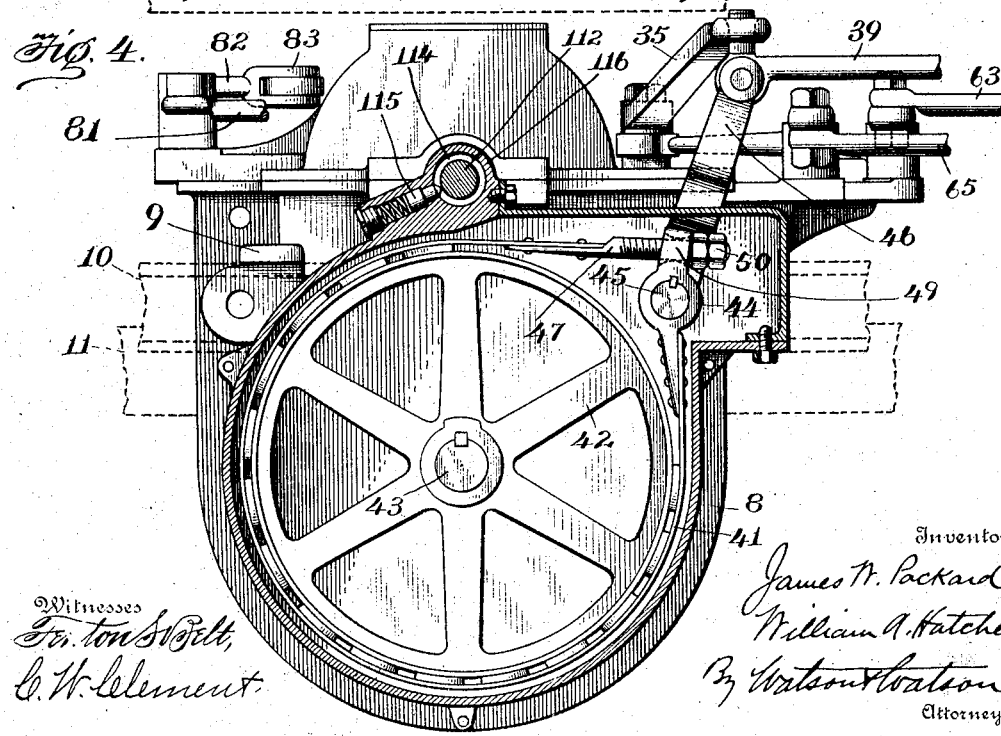

No. 773,097. PATENTED OCT. 25, 1904.
J. W. PACKARD & W. A. HATCHER.
CONTROLLING MECHANISM FOR MOTOR VEHICLES.
APPLICATION FILED MAR. 5, 1902.
NO MODEL. 5 SHEETS—SHEET 4.
Fig. 5.
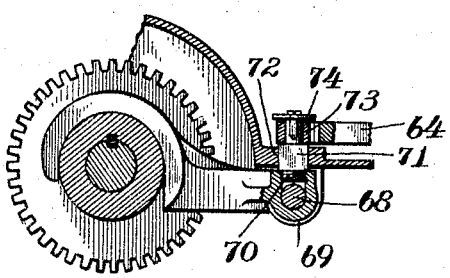
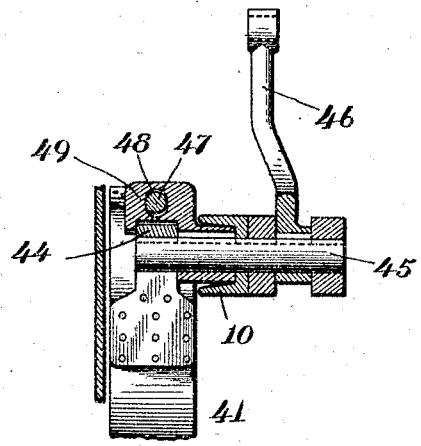
Fig. 6.

No. 773,097. PATENTED OCT. 25, 1904.
J. W. PACKARD & W. A. HATCHER.
CONTROLLING MECHANISM FOR MOTOR VEHICLES.
APPLICATION FILED MAR. 5, 1902.
NO MODEL. 5 SHEETS—SHEET 5.
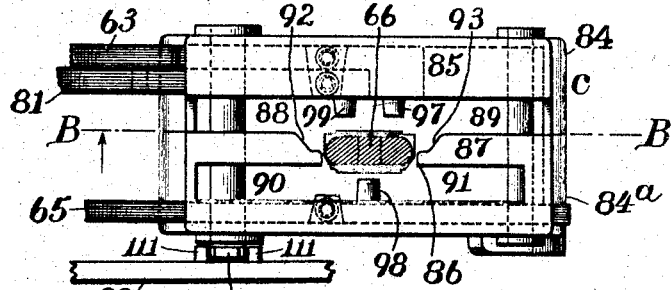
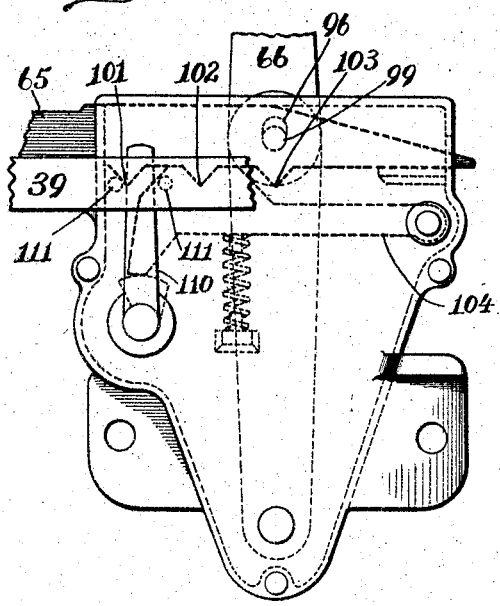
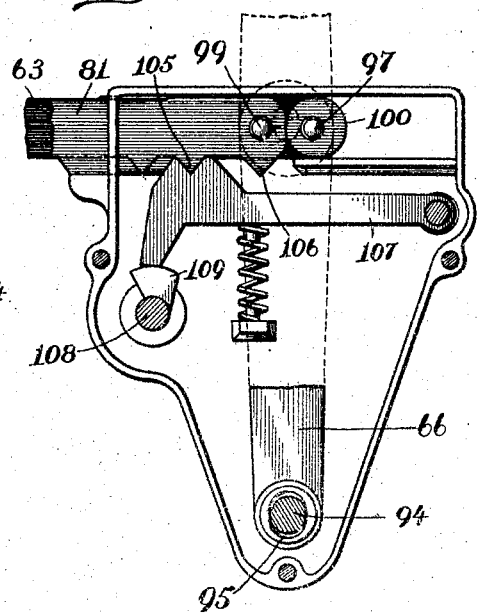
Witnesses
Fenton S. Belt
C. W. Clement
Inventors
James W. Packard
William A. Hatcher
By Watson & Watson
Attorneys No. 773,097. Patented October 25, 1904.

UNITED STATES PATENT OFFICE.

JAMES W. PACKARD AND WILLIAM A. HATCHER, OF WARREN, OHIO, ASSIGNORS TO OHIO AUTOMOBILE COMPANY, OF WARREN, OHIO, A CORPORATION OF WEST VIRGINIA.

CONTROLLING MECHANISM FOR MOTOR-VEHICLES.

SPECIFICATION forming part of Letters Patent No. 773,097, dated October 25, 1904.

Application filed March 5, 1902. Serial No. 96,829. (No model.)

*To all whom it may concern:*

Be it known that we, JAMES W. PACKARD and WILLIAM A. HATCHER, citizens of the United States, residing at Warren, in the county of Trumbull and State of Ohio, have invented certain new and useful Improvements in Controlling Mechanism for Motor-Vehicles, of which the following is a specification.

The present invention comprises improvements in devices for controlling the speed and direction of motor-vehicles; and it includes a novel arrangement of gears and gear-shifting devices whereby the several combinations of gearing to produce the desired results may be effected by the operation of a single lever, improvements in devices for clutching the driving-gear shaft to the power and for applying and releasing the brake, and other minor features of construction.

In the accompanying drawings, which illustrate the invention, Figure 1 is a plan view of a motor-vehicle frame equipped with the improvements. Fig. 2 is a vertical section through the gearing and clutch. Fig. 3 is a plan view, partly in section, of the gearing and gear-case, the cover of the case being removed. Fig. 4 is a side view of the gear-case, the housing surrounding the brake-wheel being in section, on the line A A of Fig. 2. Fig. 5 is a detail view showing the construction of one of the gear-shifting devices. Fig. 6 is a detail view showing the connection of the band-brake to the brake-lever. Figs. 7 and 8 are plan and side views, respectively, of the guide-box for the controlling-lever; and Fig. 9 is a side view of one-half of the guide-box on the line B B of Fig. 7.

Referring to the drawings, *a* indicates an automobile-frame on which is suitably supported an explosive or other type of engine 1, which operates a driving-shaft 2, having thereon a fly-wheel 3. The power to drive the vehicle is transmitted from the engine-shaft 2 to differential gearing 4, arranged upon the driving-axles of the vehicle, through the medium of a clutch *b*, sprocket-wheels 5 and 6, chain 7, and intermediate gearing arranged between the sprocket-wheel 6 and clutch and contained within a gear-casing 8.

The clutch, gearing, and the means for operating the same and for applying the brake constitute the subject of the present invention, and it is therefore unnecessary to describe the motor and vehicle in detail, as they form no part of the invention claimed herein. The gear-casing 8 is suitably supported by means of lugs 9, which rest upon and are bolted to I-beams 10 and 11, which latter form parts of the vehicle-frame. Mounted in suitable bearings 12 and 13 in the upper part of the casing is a driving-gear shaft 14, arranged in line with the engine-shaft 2, and this driving-gear shaft carries one of the members of the clutch *b*, the other member being carried by the engine or other power shaft 2. As shown, one member of the clutch comprises a disk-like holder 15, mounted upon the hub 16 of the fly-wheel and held against rotation thereon by one or more arms 17, which are engaged by lateral projections 18 upon the wheel, said holder having an outwardly-projecting peripheral flange 19, within which is arranged a friction-disk 20, connected to the spider 15 by a suitable number of keys 21, which are rigidly secured to the holder and engage slots 22 in the periphery of the friction-disk. The friction-disk is thus rotatable with the holding-disk and capable of slight lateral movement. The bottom of each slot is rounding in form, as shown, in order to permit a slight lateral play between the friction-disk and the spider, which is necessary to accommodate slight changes in the alinement of the power and driving gear shafts when the machine is in operation. The friction-disk 20 is arranged between a pair of clamping-disks 23 and 24, forming parts of the other clutch member, which disks are rotatably secured to the driving-gear shaft 14. As shown, the disk 24 is provided with a long hub 25, which extends through a central opening in the friction-disk, and this hub is rigidly secured to the driving-gear shaft by a key fitting within a keyway 26. The clamping-disk 23 is keyed upon the hub 25 and is movable longitudinally thereon. Secured to the outer end of the hub 25 by a key and threaded joint is a ring or spider 28, having thereon arms 29, on which are pivotally mounted short levers 30, having rollers 31 at their outer ends and having their faces 32, which bear against the disk 23, beveled, as shown. A collar 33, fitting loosely on the driving-gear shaft and movable lengthwise thereof, is adapted when moved to the right in Fig. 2 to bear radially outward upon the rollers 31, thereby forcing the opposite ends of the levers 30 against the clamping-disk 23. This pressure of the levers against said disk 23 forces the latter against the friction-disk 20, which in turn is forced against the clamping-disk 24. The two clamping-disks 23 and 24 are therefore caused to frictionally engage the opposite sides of the disk 20 by the movement of the collar 33 to the right. The periphery of the collar 33 is curved transversely, as shown, so that after passing beyond the centers of the rollers in its movement to the right the collar will be locked in place by the rollers. Spring-pressed rings 34 are arranged in the opposing faces of the clamping-disks and tend to hold the latter out of engagement with the friction-disk when the clutch is thrown out of action. The clutch is moved into and out of engagement by means of a bell-crank clutch-lever 35, having forked arms 36, which engage studs 37, carried by a collar 38 within a recess upon the collar 33. This bell-crank lever is connected by a link 39 to a hand-lever 40, arranged conveniently to the operator. By moving the hand-lever in one direction the clutch members are engaged, and by moving said lever in the opposite direction the clutch members are disengaged. This movement of the link 39 to engage and disengage the clutch members is also availed of to release and apply a band-brake 41, which encircles a brake-wheel 42, the latter being keyed to a driven or counter shaft 43, which extends through the casing parallel with the driving-gear shaft and carries at one end the brake-wheel and at the opposite end the sprocket-wheel 6. One end of the brake-band is provided with an eye 44, which is keyed upon a rock-shaft 45, journaled in one side of the casing and operated by a brake-arm 46, which is also keyed to said rock-shaft and pivotally connected with the link 39. The opposite end of the brake-band is secured to a threaded stud 47, which extends through an opening 48 in a lug 49, which lug is also keyed to the rock-shaft. The stud is adjustably secured to the lug by means of lock-nuts 50. The opening 48, as shown in section, Fig. 6, and also in dotted lines in Fig. 4, is enlarged or countersunk at each end to permit the lugs to rock without disturbing the alinement of the pin. When the link 39 is pulled from its rearmost to its foremost position, the clutch will be released and the brake will be applied and the reverse extreme movement of the link will release the brake and engage the clutch members. In the mid-position of the link neither the clutch nor the brake will be engaged.

Three gears 51, 52, and 53 of successively greater diameters are arranged to slide on and turn with the driving-gear shaft 14, and three gears 54, 55, and 56, respectively, having successively smaller diameters, are rigidly secured to the counter-shaft 43. The smallest gear, 51, upon the driving-gear shaft is movable into and out of engagement with the gear 54 upon the counter-shaft by means of a shifting-arm 57, having a curved end 58, which fits within an annular recess in a long collar 59. The gears 52 and 53 are rigidly connected together and are movable lengthwise of the shaft by a shifting-arm 60, having a curved end 61, which fits within an annular recess formed between the gears. The gears 55 and 56 upon the shaft 43 are separated from one another by a distance greater than the width of the two connected gears 52 and 53. When said connected gears are moved to the extreme left, as shown in Fig. 2, the gear 53 engages the gear 56. When moved to the extreme right, the gear 52 engages the gear 55, as shown in Fig. 3. In the mid-position of the gears 52 and 53 neither will engage the gears upon the counter-shaft, and it is impossible for both of said gears to be in engagement with their coöperating gears upon the counter-shaft at the same time. The elongated collar 59, connected with the gear 51, forms a stop for the gears 52 and 53 when moved to the right in Fig. 2. As will be readily seen, the arrangement is such that three different speeds may be given to the counter-shaft 43 and driving-sprocket 6 by the engagement of the gears upon the clutch-shaft with their coöperating gears upon the counter-shaft.

The shifting-arm 57, which moves the gear 51 into and out of engagement with its coöperating gear 54, is operated by means of a bell-crank lever 62 and a link 63, and the shifting-arm 60 is operated by similar lever 64 and link 65, the movement of said links being controlled by a hand-lever 66, pivotally arranged within a controlling device c and adapted to engage with either of said links, as will be hereinafter described. Each of the arms 57 and 60 is arranged to slide upon a guide-rod 68, which is located within the casing parallel with the clutch-shaft, and the connections between the shifting arms and their respective levers are the same in each case. As shown in Fig. 5, the guide-rod 68 extends through a sleeve 69 upon the outer end of the arm 60, and a guide-pin 70 fits into a threaded opening in the upper side of the sleeve. This guide-pin 70 has a rectangular portion 71, which extends through a guide-slot 72 in the top of the casing, and upon the upper end of the pin above the squared portion is journaled a rectangular block 73, which, as shown, is held in place by a washer 74. The lever 64 is provided with a fork end 75, which engages the sides of the block 73. The lever 62 is also provided with a fork end 76, which engages a block upon a similarly-arranged stud 77, secured to a sleeve upon the shifting arm 57. The squared portions of the studs or guide-pins engaging the walls of the guide-slots prevent the pins from turning and working out of the sleeves, and the forks upon the levers permit the studs to move in a straight line without binding against the levers, which swing about their pivotal points. A longitudinally-movable shaft 78 extends into the gear-casing parallel with the driving and counter shafts, and fixed to said shaft 78 are two reversing-gears 79 and 80, which are adapted to mesh with the gears 51 and 54, respectively, when the shaft 78 is moved inwardly and to become disengaged from said gears when said shaft is moved outwardly into the position shown in Fig. 3. This engagement of the gears, it will be seen, causes the counter-shaft 43 to turn in the reverse direction. The longitudinal movement of the reversing-shaft 78 is accomplished through the medium of a link 81, connected to one arm of a bell-crank lever 82, and a rod 83, connected to the other arm of the lever and to the shaft 78.

The forward ends of the links 63, 65, and 81 extend into the guide-box or switching device c, which is secured to the frame of the vehicle. The device c comprises a casing made in two parts 84 and 84ª, suitably bolted together and having in its top wall or plate 85 thereof two parallel slots which are connected together at the center by a transverse opening 86 in the center of the partition 87, thus forming four notches 88, 89, 90, and 91. The partition is beveled at either side of the opening 86, as indicated by the numerals 92 and 93. The controlling-lever 66 is mounted upon a pivot bolt or shaft 94, extending transversely through the lower part of the casing beneath the opening in the partition, and the opening 95 in the lever, through which the pivot-bolt extends, is enlarged in order to permit the lever to rock laterally and be movable through the opening in the partition and into any one of the notches in the guide-plate. The lever has a vertically-elongated eye 96 (shown in dotted lines) extending transversely through it below the guide-plate, and the links 63, 65, and 81 are provided with inwardly-projecting pins 97, 98, and 99, respectively, adapted to be engaged by said eye. The link 63, as shown in dotted lines in Fig. 7 and in full lines in Fig. 9, has an inwardly-turned end 100, extending around the end of the link 81, and in the normal positions of the parts the pins 97 and 99 upon said ends are at substantially equal distances from the center of the opening in the partition, and the links 63 and 81 are movable by the lever in opposite directions from the normal positions. The bevel or cam surfaces 92 and 93 guide the operating-lever so that the eye may engage the pins upon the links. The pin 98 upon the link 65 in its normal position is centrally located, as shown, and is movable by the lever in both directions from the center.

The link 65 is provided on its lower side with three teeth 101, 102, and 103, as shown in dotted lines in Fig. 8, and a spring-pawl 104, also shown in dotted lines, is adapted to engage these teeth in the central and extreme backward and forward positions of the link. Similarly, the link 81 is provided with two teeth 105 and 106, which are engaged by a spring-pawl 107 in the two positions to which the link is movable, and the link 63 is also provided with two teeth and a coöperating pawl. A cam-shaft 108, extending transversely through the casing beneath the pawls, is provided with a cam-surface 109, adapted to engage each of the pawls and lock the latter in engagement with the teeth upon the links. A lever 110 upon this cam-shaft extends upwardly between two projections 111 upon the link 39, which operates the clutch, the arrangement being such that when the clutch is released the pawls will be unlocked and when the clutch is engaged the pawls will be locked.

In operation when it is desired to change the speed of the vehicle or to reverse its motion the clutch is first released by throwing the clutch-lever 40 to its mid-position, and the gears are then shifted by moving the links with the operating-lever, after which the clutch-lever is moved backward, throwing the clutch into engagement. When the operating-lever 66 is moved into the notch 89, the eye in the lever engages the pin 97 upon the link 63 and the latter is moved forward, thereby throwing the smallest gear 51 upon the driving-gear shaft into engagement with the largest gear 54 upon the counter-shaft, which counter-shaft is thereby given its slowest speed. The withdrawal of the controlling-lever from the notch 89 to its mid-position throws the gear 51 out of engagement with the gear 54 and into the position shown in Figs. 2 and 3. The movement of the controlling-lever into the notch 90 moves the link 65 rearwardly, thereby throwing the intermediate gear 52 into engagement with its coöperating gear 55 and giving an intermediate speed to the counter-shaft. The movement of the lever into the notch 91 draws the link 65 forward, thereby moving the gear 53 into engagement with the gear 56 and giving to the counter-shaft its highest speed. When the controlling-lever is in the mid-position, the gears 52 and 53 are in the mid-position between the gears 55 and 56. When it is desired to reverse the vehicle, the lever is moved into the notch 88, thereby causing the rearward movement of the link 81 and the engagement of the reversing-gears 79 and 80 with the gears 51 and 54, respectively. As the controlling-lever and the link with which it is at any time connected must be brought to the central position before a change in gearing can be effected, it is impossible to manipulate the controlling-lever so as to throw more than one pair of gears into engagement at a time. No change in the gearing can be accomplished except while the clutch is released, owing to the locking of the pawls by the cam which is controlled by the movement of the clutch-lever, and the several links are locked against accidental movement at all times while the gearing is connected to the power-shaft. By connecting gears 52 and 53 so that they may be operated by a single shifting arm and separating the gears 55 and 56 by a distance greater than the width of said connected gears the single link 65 suffices to effect two changes in speed.

For convenience in starting the explosive-motor shown in the drawings a hand-crank 112 is detachably connected to the outer end of the driving-gear shaft. This is conveniently accomplished by providing a shank upon the end of the crank-shaft, which shank enters a socket in the end of the clutch-shaft, as shown in dotted lines in Fig. 2. A pin 113 upon said shank engaging a notch in the wall of the socket enables the operator to turn the driving-gear shaft and power-shaft in the proper direction to start the motor. When the motor is self-acting, the crank-shaft is forced out of engagement with the driving-gear shaft by an inclined wall of the notch, which bears outwardly on the pin 113. The crank-shaft is formed with a groove 114, into which a spring-pin 115 in the crank-bearing 116 extends. This pin holds the crank in its normal position out of engagement with the driving-gear shaft while permitting the crank-shaft to be moved into engagement with the shaft or withdrawn from its bearing at will.

Suitable passage-ways are provided for oiling each of the bearings and the spring-pressed rings 34, and the gears within the casing are lubricated by oil which is maintained at a suitable height in the lower part of the casing.

Having described our invention, what we claim, and desire to secure by Letters Patent, is—

1. In a motor-vehicle, the combination with a series of change-gears, means for shifting said gears relatively, and a clutch for operating said gears, of a locking device operable independently of the gear-shifting means for preventing the shifting of the gears while the clutch is operative.

2. In a motor-vehicle, the combination with a series of change-gears and a clutch for operating the same, of a locking device for preventing the shifting of the gears while the clutch is operative, and means for unlocking the gears simultaneously with the opening movement of the clutch.

3. In a motor-vehicle, the combination with a series of gears, and means for throwing them into and out of mesh to effect different speeds, of means for locking the gears in any one of their operative positions, a clutch, and means for unlocking said gears, said latter means being operable only when the clutch is opened.

4. In a motor-vehicle, the combination with two series of gears, and means for sliding one series relatively to the other, of means for locking the sliding gears in their several operative positions, a clutch for transmitting power to said gears, a lever for operating the clutch, and connections between said lever and the locking devices for the gears, whereby said locking devices are automatically unlocked when the clutch is opened.

5. In a motor-vehicle, the combination of a clutch, a series of gears operated by said clutch, a second series of gears, a lever for throwing the gears of the first series into and out of mesh with the gears of the second series, a hand-lever and connections for operating said gear-shifting lever, a second lever for operating the clutch, and a locking device for the gear-shifting mechanism automatically controlled by the clutch-operating mechanism.

6. In a motor-vehicle, the combination with a series of change-gears and means for shifting said gears relatively, of means operable independently of the gear-shifting means for locking said gears against such movement.

7. In a motor-vehicle, the combination with a plurality of gears, and means for shifting one or more of said gears relatively to the others, of a clutch for connecting said gears with a driving-shaft, and means operable independently of the gear-shifting means for locking said gears against such shifting movement when the clutch is operative.

8. In a motor-vehicle, the combination of a series of gears, means for shifting one or more of said gears to effect different speeds, a clutch for connecting said gears with power mechanism, and means operable independently of the gear-shifting means for locking said gears against such shifting movement when the clutch is operative, the last said means being operated to unlock the gears when the clutch is opened.

9. In a motor-vehicle, the combination with a plurality of gears, a clutch for connecting said gears with a power mechanism, and means for shifting one or more of said gears relatively to the others to effect different speeds, of means for locking the gears against movement when the clutch is operative, and a lever independent of the gear-shifting means for releasing said locking means.

10. In a controlling mechanism for motor-vehicles, the combination with a driving-shaft and a counter-shaft, coöperating gears thereon, and mechanism for shifting the gears to effect changes in speed, of a power-shaft, a clutch for connecting the driving-shaft to the power-shaft, devices for engaging and disengaging the clutch members, and means operated by said devices for locking the gear-shifting mechanism while the clutch is engaged, and for unlocking said mechanism when the clutch is disengaged.

11. In a controlling mechanism for motor-vehicles, the combination with the gear-shafts and coöperating gears thereon, of means for shifting said coöperating gears into and out of engagement with one another, comprising links, an operating-lever adapted to move said links, pawls arranged to engage said links in their several positions of adjustment, and means for locking said pawls in engagement with the links.

12. In a controlling mechanism for motor-vehicles, the combination with a power-shaft, gear-shafts, coöperating gears thereon, a clutch for connecting the power-shaft to one of the gear-shafts, devices for operating said clutch, and mechanism for shifting said coöperating gears into and out of engagement with one another comprising links and an operating-lever adapted to move said links, of means controlled by the clutch-operating devices for locking said links against movement while the clutch is engaged and for unlocking said links when the clutch is disengaged.

13. In a controlling mechanism for motor-vehicles, the combination with a power-shaft, gear-shafts, coöperating gears thereon, a clutch for connecting the power-shaft and one of the gear-shafts, means for operating said clutch, and mechanism for shifting said coöperating gears into and out of engagement with one another, comprising links and an operating-lever adapted to move said links, of pawls adapted to engage said links and a cam movable by the clutch-operating means into and out of engagement with said pawls and arranged to lock and unlock the pawls.

14. In a controlling mechanism for motor-vehicles, the combination with a driving-shaft and a counter-shaft, three sets of coöperating gears thereon, the gears upon one shaft being movable into and out of engagement with the coöperating gears upon the other shaft, of mechanism for shifting the gears to effect three different speeds comprising two longitudinally-movable links and a lever adapted to engage one of said links and move it in two directions from its normal position and to engage and move separately the other link in one direction from the normal position.

15. In a controlling mechanism for motor-vehicles, the combination with a driving-gear shaft, and a counter-shaft, three sets of coöperating gears thereon, the gears upon one of said shafts being movable into and out of engagement with the gears upon the other shaft to effect three changes in speed, and reversing-gears movable into and out of engagement with gears upon said shafts, of a link movable in one direction only from the normal for engaging the reversing-gears, a second link movable in the opposite direction only for engaging one pair of speed-changing gears, and a third link movable in two directions from the normal to effect two changes in speed, and a lever adapted to engage and move each of said links separately.

16. In a controlling mechanism for motor-vehicles, the combination with changeable speed-gearing and reversing-gearing, of a guide box or plate having two parallel slots therein and a central opening in the partition between said slots forming four notches, a controlling-lever movable through said opening into the notches, two links movable in opposite directions and arranged to operate the reversing-gearing and the slow-speed gearing respectively, each of said links having a part adjacent to one of the slots adapted to be engaged by the lever, and a link arranged to engage the intermediate and high speed gearing having a part adjacent to the other slot and adapted to be engaged by the lever when the latter is moved into either of the notches of said latter slot.

In testimony whereof we affix our signatures in presence of two witnesses.

JAMES W. PACKARD.
WILLIAM A. HATCHER.

Witnesses:
E. L. WARNER,
C. H. DUNLAP.